March 22, 1938. A. C. DAMAN 2,111,843
FILTER
Filed March 14, 1934 2 Sheets-Sheet 1
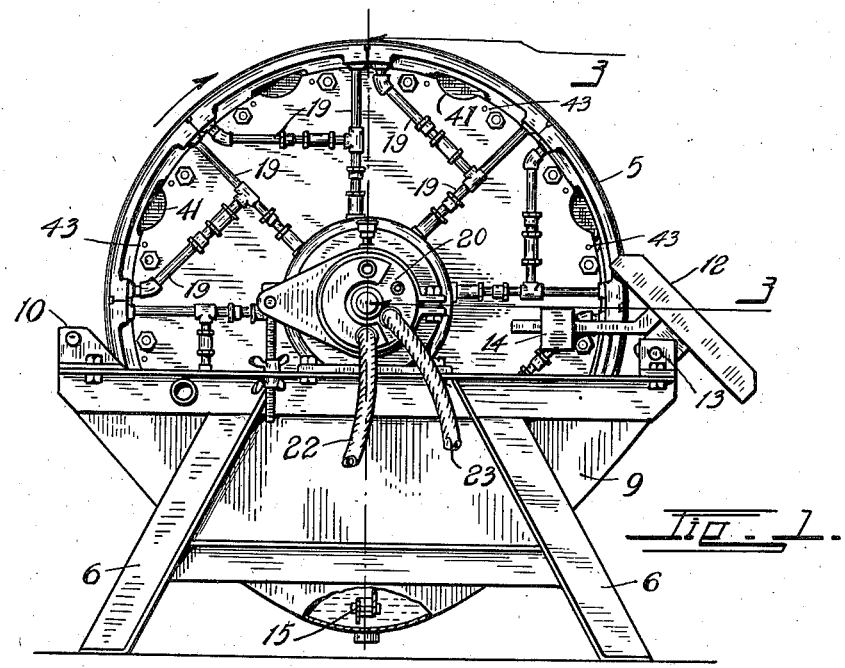
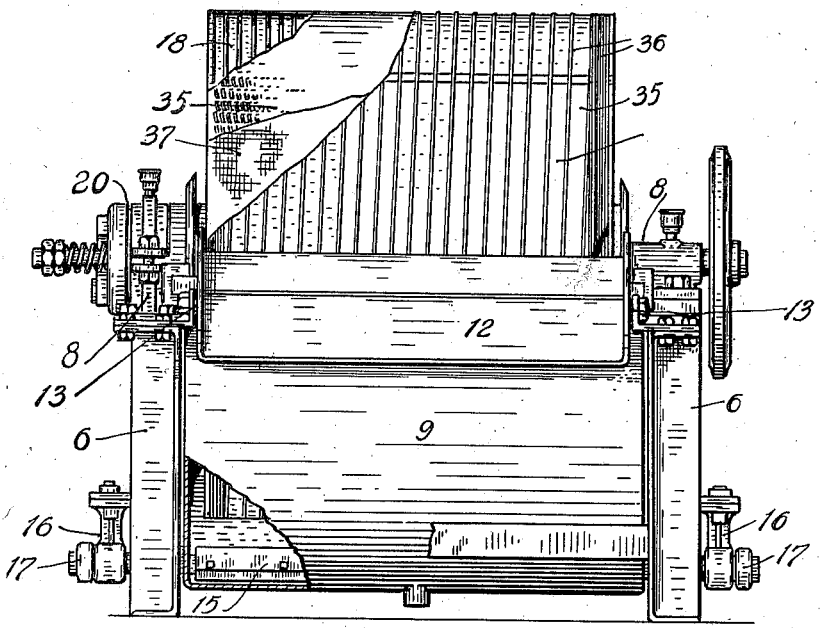
Inventor
ARTHUR C. DAMAN
By [signature]
Attorney

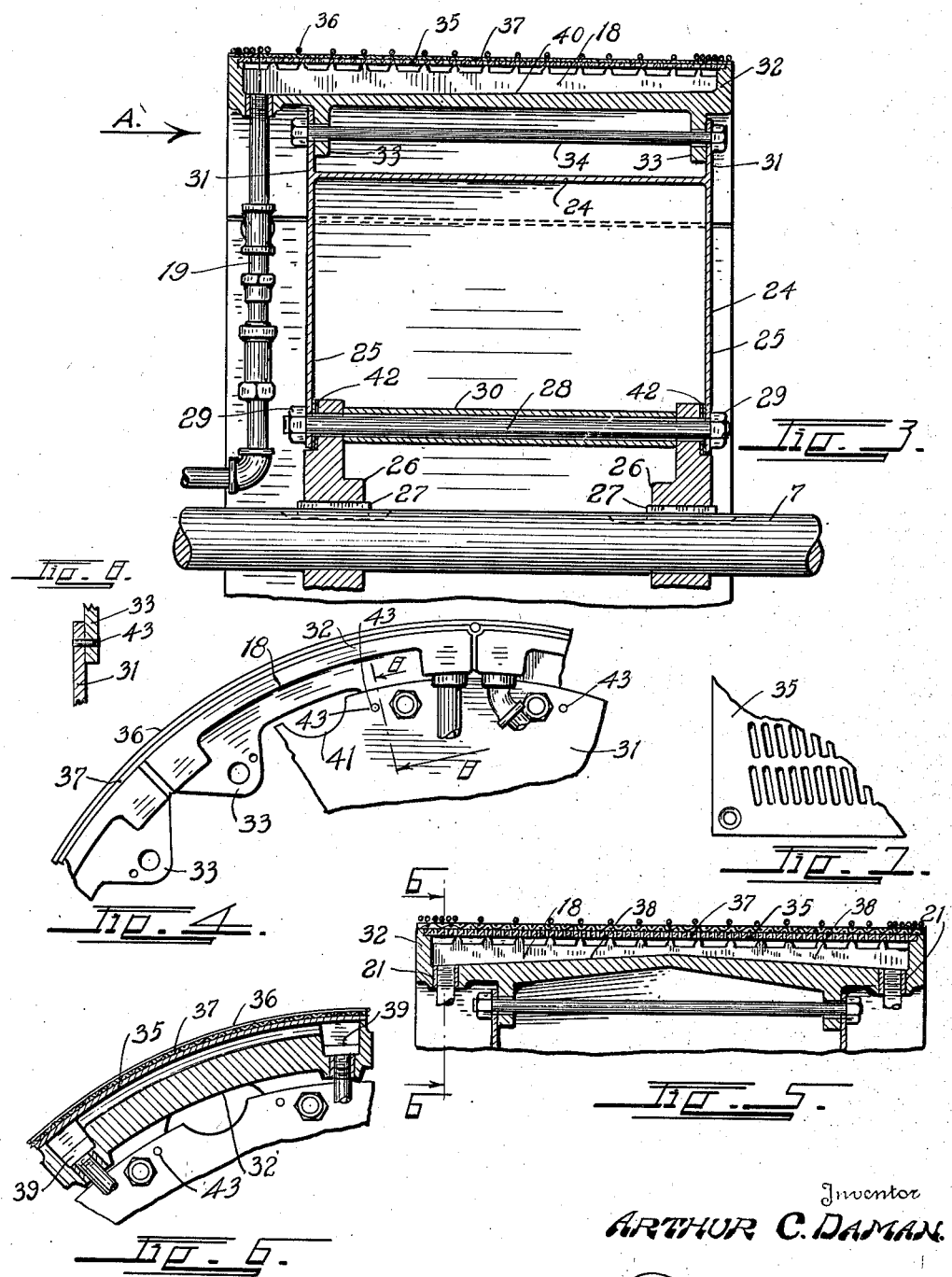

Patented Mar. 22, 1938

2,111,843

UNITED STATES PATENT OFFICE 2,111,843

FILTER

Arthur C. Daman, Denver, Colo.

Application March 14, 1934, Serial No. 715,461

7 Claims. (Cl. 210—202)

This invention relates to rotary filters of the type in which a continuous series of screen-covered compartments at the circumference of a rotating drum, are during successive periods in the rotary movement, subjected to the influence of a partial vacuum and air pressure for the filtration of a liquid from solid constituents in an aqueous material under treatment, and the subsequent discharge of the cakes of solid residue formed exteriorly of the compartments upon their screen-covered outer sides thereof.

It is an object of the present invention to provide in a filter machine of the above described character, a novel method of constructing the rotating element thereof, which combines economy in production and installation, with strength, durability, greater efficiency and practicability in use.

Another object resides in the provision of a novel formation of the filter compartments, which facilitates and expedites the movement of the filtrate from the compartments, and still further objects are to be found in details of construction and novel and advantageous arrangements and combinations of parts, as will be fully set forth in the course of the following description.

In the accompanying drawings in the several views of which like parts are similarly designated, Figure 1 represents an end elevation of a filtering machine embodying the distinctive features of the present invention.

Figure 2, a partially sectional side elevation of the same,

Figure 3, an enlarged fragmentary section in the plane indicated by the line 3—3 of Figure 1, Figure 4, a fragmentary side elevation looking in the direction of the arrow A in Figure 3, Figure 5, a fragmentary section similar to that of Figure 3 showing a modified construction, Figure 6, an enlarged section along the line 6—6 of Figure 5, Figure 7, a fragmentary detail view of one of the screen-covers at the circumference of the drum, and Figure 8, a section on the line 8—8 of Figure 4.

Referring further to the drawings, the filter as shown comprises a drum 5 mounted for rotation about a horizontal axis upon a suitable frame 6.

The drum proper is carried by a shaft 7 which is supported in bearings 8 at opposite sides of the frame and a tank 9 inside the frame provides a bath into which the drum immerses during its rotary movement. The material to be filtered is fed into the tank at a point indicated at 10 in Figure 1, and a scraper 12 pivoted upon the supporting frame as at 13, is held in contact with the periphery of the drum by one or two counterweights 14.

An agitator 15 in the bottom portion of the tank, keeps solids in suspension, thereby facilitating their ultimate discharge.

As shown in Figure 2, the agitator 15 is mounted for rotation in bearings 16, and is rotated by means of a belt which connects a pulley 17 on a trunnion of the agitator with a conveniently located driving element. The filter-compartments at the circumference of the drum, generally designated by the reference numerals 18, are connected by means of a system of pipes 19 at either one side or both sides of the drum, with a valve-mechanism indicated at 20, which during the rotary movement of the drum connects the peripheral compartments thereof, with a suction means and with a source of pressure-fluid alternately during determinate periods in the rotary movement of the drum.

In Figure 3, the pipe system is shown at only one side of the drum, while in Figure 5 the compartments are shown with openings 21 to be connected with pipes at opposite sides of the drum. Figure 1 shows at 22 a conduit connecting the valve with the suction element and at 23 a conduit connecting the same with a source of pressure fluid.

The elements and constructions so far described, are common in filtering apparatus of similar character used heretofore, and are, broadly considered, not parts of the present invention, which, as stated hereinbefore, resides mainly in the method of constructing, arranging and combining the constituent elements of the machine, as will hereinafter be described.

The valve construction has not been shown in detail since any suitable mechanism capable of producing the desired result may be employed.

The drum comprises a body-member composed of parallel circular side plates 25 connected adjacent their peripheral edges by a cylindrical wall-member 24, all made preferably of steel or other sheet metal. While the plates and the wall have been shown in Figure 3 of the drawings, as integral with each other, it will be understood without further illustration, that they may be made separately from each other and fastened together by bolts, rivets, welding or other suitable methods.

The side plates 25 are annular in form and they have at their inner edges, series of bolt holes for mounting the drum upon its shaft.

The latter is to this end provided with flanged collars 26, the rotative continuity of which with the shaft, is established by keys 27 or other similar means.

The collars have bolt holes registering with those of the side plates of the drum, and rods 28 extending through the holes at opposite sides of the drum, and nuts 29 screwed upon the projecting extremities of the same, provide bolts by which the drum is securely but detachably mounted upon the shaft. Distance-sleeves 30 around the bolts and between the collars reenforce the structure.

The outer portions of the side plates projecting beyond the circumferential wall-member, provide flanges 31 for the assembly of the parts which constitute the filter compartments hereinbefore referred to and designated by the numerals 18. Pan-shaped sections 32, preferably made of cast metal, adjoin one another in end-to-end continuity to form the series of compartments extending in circular succession around the periphery of the drum. The sections have inwardly projecting circular flanges 33 extending contiguous to the flanges 31 of the drum at the inner sides of the same.

The several flanges have registering and alined bolt holes, and bolts 34 composed as those hereinbefore described, of rods, and nuts and/or heads at projecting ends thereof, extend through the registering bolt holes at opposite sides of the drum and fasten the sections 32 securely but detachably upon the drum. In order to insure the accurate placement of the filter sections and their rigid connection with the drum, independent of the bolts 34, the lapping flanges have been provided with alined holes for the application of dowel pins 43, best shown in Figure 8 of the drawings.

A sectional screen 35 preferably made of perforated plates, as shown in Figure 7, is fastened in rabbets at the outer edges of the sides of the pan-shaped sections, and wire shaped bands 36 wound around the screens, aid in holding them in place. The ends of the sections may be serrated as shown at 37 in Figures 3 and 5, for the support of the screen without interfering with the flow of the filtrate in the operation of the machine.

Referring to Figures 5 and 6 of the drawings, the compartments at the periphery of the drum have bottom-surfaces 38 sloping oppositely from a median line to pockets 39 at opposite ends of the compartments, the screw-threaded openings 21 in the bottom of these pockets connecting with the pipes 19 of systems at opposite sides of the drum which connect the compartments 38 with the valve-mechanism 20, which in this instance is composed of two parts at opposite sides of the machine.

When, as in Figure 3, but one valve-mechanism and one pipe-system is applied at but one side of the drum, the bottom 40 of the compartments slopes continuously from one end to the other to connect with but a single pocket at one end of the compartments.

The side plates of the drum have peripheral indentations 41 at opposite sides of the sections 32, to provide for the free passage of solids and/or liquid to the tank in case of leakage.

In the operation of the machine, the material fed into the tank is drawn by a partial vacuum to the circumferential surface of the drum during its passage through the tank, the filtrate passing through the meshes of the screens into the compartments and thence through the respective pipes to a point of delivery, while the solids congregate upon the surface of the screens in the form of cakes. At the descending side of the drum, these cakes are dislodged by pressure fluid introduced to the compartments thru the pipes 19, and are removed from the drum by the scraper 12.

Aside from the method of constructing and mounting the drum, a distinctive feature of the invention resides in the position of the pipe-systems exteriorly of the drum and readily accessible for adjustment or repair. As shown, the pipes are made up of sections interconnected by unions, all of which are within easy reach at the outside of the drum.

Another important feature in the construction of the drum is that after the sections have been assembled at the circumference of the drum, the entire assembly may be placed in a lathe and smoothed circumferentially to true cylindrical form whereby to provide a smooth surface for the continuous and even contact of the scraper. An essentiality of the construction for this purpose is that the circumferential wall be formed of an artificial machinable composition at its outer surface.

All of the parts of which the drum is composed, may be separately removed and replaced in case of wear or breakage and the compartments are accessible for cleaning whenever necessary.

A further distinctive feature of the construction is that the drum made fluid-tight by washers and gaskets 42 around the bolts 28, displaces a large amount of liquid in the tank so that but little liquid is present in the tank at any one time and so that no liquid remains in the tank for any length of time, thus avoiding detrimental effects of chemical substances in material under treatment.

Moreover, the water-tight drum has a buoyant effect thereby reducing the amount of power required to operate the filter.

What I claim and desire to secure by Letters Patent is:

1. As a new article of manufacture, a screen-supporting element for filter drums, comprising an arcuate body having a flanged portion projecting laterally beyond its face of lesser length, the face of greater length being recessed, with the recess progressively increasing in depth from its median portion to one of its sides, there being an opening thru the face of lesser length into the recess adjacent its area of greatest depth.

2. As a new article of manufacture, a screen-supporting element for filter drums, comprising an arcuate body having a flanged portion projecting laterally beyond its face of lesser length, the face of greater length being recessed, with the recess progressively increasing in depth from its median portion in opposite directions to its sides, there being an opening thru the face of lesser length into the recess at each end thereof adjacent its area of greatest depth.

3. In a filter of the character described, a shaft, and a drum comprising side-plates mounted on the shaft, a cylindrical member connecting the side-plates at a distance from their peripheral edges, a series of metal, screen-covered, compartment sections having flanges lapping the peripheral portions of the side-plates, the flanges and said portions having registering bolt-holes, and bolts in the bolt-holes, holding the sections in bridging relation to the side-plates, whereby the said sections act as component structural elements of the drum.

4. In a filter of the character described, a shaft, and a drum comprising side-plates mounted on the shaft, a cylindrical member connecting the side-plates at a distance from their peripheral edges, a series of metal, screen-covered, compartment sections having flanges lapping the peripheral portions of the side-plates, the flanges and said portions having registering bolt-holes, and dowel holes, dowels in the dowel holes, and bolts in the bolt-holes, holding the sections in bridging relation to the side-plates, whereby the said sections act as component structural elements of the drum.

5. In a filter of the character described, a shaft, and a drum comprising side-plates mounted on the shaft, a cylindrical member connecting the side-plates at a distance from their peripheral edges, a series of metal, compartment-sections having flanges lapping the peripheral portions of the side-plates, the flanges and said portions having registering bolt-holes, bolts in the bolt-holes, holding the sections in bridging relation to the side-plates, and a screen-element supported on the drum in contact with the bridging sections.

6. A filter section for a cylindrical drum vacuum filter comprising an element whose outer surface is curved on the arc of a circle, the ends of the section having radial walls, the sides of the section having outwardly extending segmental walls having their inside edges provided with rabbets for the reception of the edges of a perforate plate, the sections having inwardly projecting perforated lugs for attaching them to a circular support, the outer surfaces of the filter sections having a plurality of projections for engaging the inner face of the plate and transversely extending depressions with inclined bottoms for the reception of filtrate.

7. A segmental filter section for a cylindrical drum vacuum filter, comprising a segmental element having outwardly extending end walls connected at their ends by arcuate flanges that form the sides of the sections, the surface between the side flanges being provided with spaced parallel ribs, the flanges being provided along their inside edges with rabbets whose inner walls are in alinement with the outer edges of the ribs, a perforated plate having its edges in the rabbets and resting on the ribs and tranverse compartments along the insides of the end walls, the concave surfaces of the sections having perforated lugs for making connection with a rotating support.

ARTHUR C. DAMAN.